United States Patent
Sljivar et al.

(10) Patent No.: US 11,830,365 B1
(45) Date of Patent: Nov. 28, 2023

(54) SYSTEMS AND METHODS FOR GENERATING DATA DESCRIBING PHYSICAL SURROUNDINGS OF A VEHICLE

(71) Applicant: SmartDrive Systems, Inc., Westlake, TX (US)

(72) Inventors: Slaven Sljivar, San Diego, CA (US); Jason Palmer, Carlsbad, CA (US); Reza Ghanbari, San Diego, CA (US); Nicholas Shayne Brookins, Encinitas, CA (US); Barry James Parshall, Portland, OR (US); Mark Freitas, San Diego, CA (US); Daniel Andrew Deninger, Carlsbad, CA (US)

(73) Assignee: SmartDrive Systems, Inc., Westlake, TX (US)

( * ) Notice: Subject to any disclaimer, the term of this patent is extended or adjusted under 35 U.S.C. 154(b) by 308 days.

(21) Appl. No.: 16/025,852

(22) Filed: Jul. 2, 2018

(51) Int. Cl.
  *G06G 7/70* (2006.01)
  *G06G 7/76* (2006.01)
  *G08G 1/00* (2006.01)
  *G06F 11/30* (2006.01)
  *G08G 1/052* (2006.01)
  (Continued)

(52) U.S. Cl.
  CPC .......... *G08G 1/20* (2013.01); *G06F 11/3013* (2013.01); *G06F 11/3089* (2013.01); *G07C 5/008* (2013.01); *G07C 5/02* (2013.01); *G08G 1/017* (2013.01); *G08G 1/0112* (2013.01); *G08G 1/052* (2013.01)

(58) Field of Classification Search
  CPC ........ G08G 1/20; G08G 1/0112; G08G 1/017; G08G 1/052; G06F 11/3013; G06F 11/3089; G07C 5/02; G07C 5/008; G09B 9/58; G09B 9/52; G09B 9/10; G09B 9/042; A61B 2017/00716
  See application file for complete search history.

(56) References Cited

U.S. PATENT DOCUMENTS 6,888,622 B2 * 5/2005 Shimomura ............ G01S 17/86
                                                     356/28
8,297,977 B2   10/2012 Freund
                         (Continued)

FOREIGN PATENT DOCUMENTS

WO    2017195120    11/2017

OTHER PUBLICATIONS

Best Andrew et al: "AutonoVi: Autonomous vehicle planning with dynamic maneuvers and traffic constraints", 2017 IEEE/RSJ International Conference on Intelligent Robots and Systems (IROS), IEEE, Sep. 24, 2017 (Sep. 24, 2017), pp. 2629-2636, XP033266238, DOI: 10.1109/IROS.2017.8206087 [retrieved on Dec. 13, 2017] * p. 2629 * p. 2631-p. 2635.

*Primary Examiner* — Harry Y Oh
(74) *Attorney, Agent, or Firm* — ESPLIN & ASSOCIATES, PC

(57) ABSTRACT

This disclosure relates to a system that generates data describing physical surroundings of vehicles during operation. Individual vehicles carry sensors configured to generate output signals conveying information related to one or both of the physical surroundings of the vehicles and/or the operation of the vehicles. Based on the generated output signals, the physical surroundings in which the first vehicle is operating are derived, such as, for example, the speeds of different nearby vehicles, and their distances to each other.

12 Claims, 4 Drawing Sheets

(51) Int. Cl.
*G07C 5/00* (2006.01)
*G07C 5/02* (2006.01)
*G08G 1/017* (2006.01)
*G08G 1/01* (2006.01)

(56) References Cited

U.S. PATENT DOCUMENTS

| | | | |
|---|---|---|---|
| 8,626,565 B2 | 1/2014 | Petroff | |
| 9,141,109 B1* | 9/2015 | Kamata | B60W 50/14 |
| 9,147,353 B1* | 9/2015 | Slusar | G06Q 40/08 |
| 9,594,371 B1 | 3/2017 | Palmer | |
| 10,083,551 B1 | 9/2018 | Schmitt | |
| 10,818,102 B1 | 10/2020 | Freitas | |
| 2007/0048690 A1 | 3/2007 | Stricek | |
| 2007/0132773 A1 | 6/2007 | Plante | |
| 2007/0241882 A1 | 10/2007 | Panttaja | |
| 2008/0111666 A1 | 5/2008 | Plante | |
| 2008/0215202 A1* | 9/2008 | Breed | H04W 4/02 701/25 |
| 2010/0191411 A1 | 7/2010 | Cook | |
| 2012/0256770 A1 | 10/2012 | Mitchell | |
| 2013/0289873 A1 | 10/2013 | Mitchell | |
| 2014/0094992 A1 | 4/2014 | Lambert | |
| 2014/0136414 A1 | 5/2014 | Abhyanker | |
| 2014/0188776 A1 | 7/2014 | Shuster | |
| 2015/0088335 A1 | 3/2015 | Lambert | |
| 2015/0134226 A1 | 5/2015 | Palmer | |
| 2015/0178998 A1* | 6/2015 | Attard | G07C 5/008 701/23 |
| 2015/0197246 A1* | 7/2015 | Nagasaka | G05D 1/0231 701/1 |
| 2015/0254781 A1* | 9/2015 | Binion | B60W 40/10 701/32.2 |
| 2015/0316386 A1* | 11/2015 | Delp | B60W 30/12 701/532 |
| 2016/0146618 A1* | 5/2016 | Caveney | B60W 60/0053 701/25 |
| 2016/0210382 A1 | 7/2016 | Alaniz | |
| 2017/0115378 A1 | 4/2017 | Haghighi | |
| 2017/0123422 A1 | 5/2017 | Kentley | |
| 2017/0269606 A1* | 9/2017 | Kawabata | G08G 1/0141 |
| 2017/0349172 A1* | 12/2017 | Kubota | B60W 30/18163 |
| 2018/0005527 A1* | 1/2018 | Bostick | G08G 1/0141 |
| 2018/0190124 A1* | 7/2018 | Kim | B60W 30/18163 |
| 2018/0201264 A1* | 7/2018 | Schoenly | B60W 30/165 |
| 2018/0224857 A1* | 8/2018 | Yang | G05D 1/0212 |
| 2019/0088135 A1* | 3/2019 | Do | G05D 1/0055 |
| 2019/0146492 A1 | 5/2019 | Phillips | |
| 2019/0163182 A1 | 5/2019 | Li | |
| 2019/0265712 A1 | 8/2019 | Satzoda | |
| 2020/0005662 A1 | 1/2020 | Palmer | |
| 2020/0183387 A1* | 6/2020 | Heit | G06K 9/00791 |
| 2021/0056775 A1 | 2/2021 | Freitas | |
| 2022/0005291 A1 | 1/2022 | Konrardy | |

\* cited by examiner

SYSTEMS AND METHODS FOR GENERATING DATA DESCRIBING PHYSICAL SURROUNDINGS OF A VEHICLE

FIELD

The systems and methods disclosed herein are related to generating data describing physical surroundings of vehicles. In particular, based on output signals generated by sensors of a vehicle, the physical surroundings in which the vehicle is operating are derived, such as, for example, the speeds of different nearby vehicles, and their distances to each other.

BACKGROUND

Systems configured to record, store, and transmit video, audio, and sensor data associated with a vehicle, e.g. responsive to an accident involving the vehicle, are known. Typically, such systems detect an accident based on data from a single sensor such as an accelerometer. Some systems store information locally for subsequent analysis. Vehicle Engine Control Component (ECM) systems are known. Such systems interface/interoperate with external computers (e.g., at an automobile mechanic) where the data stored by the ECM system is analyzed.

SUMMARY

One aspect of the disclosure relates to a system configured to generate data describing physical surroundings of individual vehicles. The individual vehicles may form a fleet of vehicles, including a first vehicle, a second vehicle, a third vehicle, and so forth. Individual vehicles may include a set of resources for data processing and/or electronic storage, including but not limited to persistent storage. As used herein, transmission and/or distribution of information may be considered a data processing function. As used herein, the terms data and information may be used interchangeably. Individual vehicles may include a set of sensors configured to generate output signals conveying information related to one or both of the physical surroundings of the individual vehicles and/or operating conditions of the individual vehicles. Individual vehicles may communicate with each other and/or with a remote computing server. The system may include one or more sets of resources, one or more sets of sensors, a remote computing server (also referred to as centralized server or centralized cloud server), and/or other components.

One or more components of the system may include one or more processors and/or other mechanisms/components for processing information. For example, a set of resources included in and/or carried by an individual vehicle may include one or more processors. For example, the remote computing server may include one or more processors. In some implementations, other vehicle-specific components, such as, by way of non-limiting example, a vehicle event recorder, may include one or more processors. In some implementations, some or all of the processors may be configured via machine-readable instructions to perform various functions. As used herein, the term "processor" is used interchangeably with the term "physical processor."

A set of resources included in and/or carried by an individual vehicle may include one or more processors, electronic storage, a transceiver, a set of sensors, and/or other components. The first vehicle may carry a first set of resources. The second vehicle may carry a second set of resources, and so forth. The first set of resources may include a first transceiver. The second set of resources may include a second transceiver, and so forth.

Transceivers may be configured to transfer and/or receive information to and/or from other elements of the system, including but not limited to other vehicles (or components carried by other vehicles), the remote computing server, and/or other components. In some implementations, transceivers may be configured to transfer and/or receive information wirelessly, and/or otherwise provide resources for the distribution of information. For example, a transceiver may be configured to receive executable code, queries, and/or other information. For example, a transceiver may be configured to transmit results from executable code, responses to queries, information regarding detected vehicle events, information regarding physical surroundings, and/or other information, e.g., to a remote computing server. In some implementations, transceivers may be configured to obtain, measure, and/or otherwise determine one or more conditions related to data transmissions. For example, one or more current local data transmission conditions may include a current bandwidth (e.g., in MB/s), a current transmission protocol (e.g., LTE, 3G, 4G, 5G, Wi-Fi, etc.), a current transmission cost (e.g., in $/MB), and/or other conditions.

A set of sensors may be configured to generate output signals conveying information. In some implementations, the generated information may be related to one or both of the physical surroundings of individual vehicles and/or operating conditions of individual vehicles. In some implementations, the generated information may be related to circumstances around individual vehicles. An individual set of sensors may be carried by an individual vehicle. The generated information may include timing information, location information, positional information, (vehicle) operator information, traffic information, roadway information, weather information, visibility information, and/or other information. In some implementations, generated information may be associated with timing information (e.g., from a timer), location information, (vehicle) operator information, and/or other information.

In some implementations, timing information may associate and/or otherwise relate the generated output signals with one or more moments of generation by one or more particular sensors. For example, timing information may include time stamps that indicate moments of generation. For example, at a time labeled $t_1$ the speed of a vehicle may be 50 mph, at a time labeled $t_2$ the speed may be 55 mph, and so forth. A set of time stamps or moments in time may form a timeline. In some implementations, location information may associate and/or otherwise relate the generated output signals with one or more locations of generation (or, locations at the moment of generation) by one or more particular sensors. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources may be configured to store generated information, timing information, location information, operator information, and/or other information, e.g. in electronic storage.

In some implementations, a sensor may be configured to generate output signals conveying information related to the operation of the vehicle (which may include information related to one or more operating conditions of the vehicle). Information related to the operation of the vehicle may include feedback information from one or more of the mechanical systems of the vehicle, and/or other information. In some implementations, at least one of the sensors may be a vehicle system sensor included in an engine control module (ECM) system or an electronic control module (ECM) system of the vehicle. In some implementations, one or more sensors may be carried by the vehicle. The sensors of a particular vehicle may be referred to as a set of sensors. An individual sensor may be vehicle-specific.

Individual sensors may be configured to generate output signals conveying information, e.g., vehicle-specific information. The information may include visual information, motion-related information, position-related information, biometric information, and/or other information. In some implementations, one or more components of the system may determine one or more parameters that are measured, derived, estimated, approximated, and/or otherwise determined based on one or more output signals generated by one or more sensors.

Sensors may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of the system.

Individual sensors may include image sensors, cameras, and/or other sensors. As used herein, the terms "camera" and/or "image sensor" may include any device that captures images and/or other visual information, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, time-stamped, annotated, and/or otherwise processed such that information captured by other sensors can be synchronized, aligned, annotated, and/or otherwise associated therewith. For example, video information captured by an image sensor may be synchronized with information captured by an accelerometer, GPS unit, or other sensor. Output signals generated by individual image sensors (and/or information based thereon) may be stored and/or transferred in electronic files.

In some implementations, an image sensor may be integrated with electronic storage such that captured information may be stored, at least initially, in the integrated embedded storage of a particular vehicle. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud." In some implementations, the captured information may be analyzed and/or otherwise processed to detect and/or extract information, and subsequently the detected and/or extracted information may be transferred to and/or stored by one or more components of the system. For example, captured information may be analyzed using computer vision techniques such that information related to the physical surroundings of an individual vehicle may be extracted from the captured information. Advantageously, extracted information may be compressed into a much smaller amount of information than the originally captured information. For example, captured information of a sufficiently high resolution may be analyzed using computer vision techniques to determine the make and model (and/or size, color, license plate, characteristics of the vehicle operator, number of passengers, apparent damage on the visible side, etc. etc.) of a vehicle passing in the adjacent lane. This determined information can be stored in a small amount of memory, which may be much smaller than the amount that would be needed to store the original captured information.

The system may be coupled to individual vehicles. For example, the system may be communicatively coupled to individual vehicles and/or to components carried by individual vehicles, including but not limited to transceivers. For example, components of the system may be configured to communicate through one or more networks. The one or more networks may, by way of non-limiting example, include the internet. In some implementations, the one or more networks may include a cellular network and/or another communication grid.

The remote computing server may include one or more processors. The remote computing server may be remote, separate, and/or discrete from the fleet of vehicles. The one or more processors may be configured via machine-readable instructions to perform various functions. The remote computing server may be configured to facilitate presentation of a user interface to a user of the remote computing server, including but not limited to a third party using the remote computing server to query the fleet of vehicles. The user interface may be configured to facilitate interaction between one or more users and the remote computing server. For example, the user interface may be configured to receive user input, executable code, and/or other information from a user. The remote computing server may be further configured to transmit information based on received user input, received executable code, and/or other received information to some vehicles in the fleet or to all vehicles of the fleet. Information from individual vehicles, including but not limited to responses, results, detected vehicle events, physical surroundings, and/or other information generated by individual vehicles, may be transferred to, received by, and processed, analyzed, and/or presented by the remote computing server.

In some implementations, a set of resources included in and/or carried by an individual vehicle may include an event recorder (also referred to as vehicle event recorder). An event recorder may be configured to generate, detect, identify, capture, and/or record information related to the operation and/or the physical surroundings of a vehicle. Such information may include, by way of non-limiting example, information related to and/or based on vehicle events. An event recorder may be configured to off-load and/or otherwise transmit information. In some implementations, an event recorder may include one or more physical processors, electronic storage, and/or other components. In some implementations, an event recorder may detect vehicle events based on a comparison of the information conveyed by the output signals from one or more sensors to predetermined (variable and/or fixed) values, threshold, functions, and/or other information. An event recorder may identify vehicle events and/or other information related to the operation of a vehicle in real-time or near real-time during operation of a vehicle. In some implementations, an event recorder may identify vehicle events and/or other information related to the operation of a vehicle based on previously stored information. For example, the previously stored information may be based on output signals generated days, weeks, months or more ago.

As used herein, the term "vehicle event" may refer to forward motion, motion in reverse, making a turn, speeding, unsafe driving speed, collisions, near-collisions, driving in a parking lot or garage, being stalled at a traffic light, loading and/or unloading of a vehicle, transferring gasoline to or from the vehicle, and/or other vehicle events in addition to driving maneuvers such as swerving, a U-turn, freewheeling, over-revving, lane-departure, short following distance, imminent collision, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, parking a vehicle, performing fuel-inefficient maneuvers, and/or other driving maneuvers or combinations thereof.

Some types of vehicle events may be based on the actions or motion of the vehicle itself. Some types of vehicle events may be based on the actions or motion of nearby vehicles. Other types of vehicle events may be based on the actions taken or performed by a vehicle operator. Some types of vehicle events may be based on the actions taken or performed by vehicle operators of nearby vehicles. Some types of vehicle events may be based on a combination of the actions or motion of the vehicle itself, nearby vehicles, and/or the actions taken or performed by a particular vehicle operator or nearby vehicle operator. For example, a particular vehicle event may include hard braking followed (within a predetermined window of time) by a sharp turn and/or swerve. This particular vehicle event may indicate a near-collision that was severe enough that the vehicle operator decided that merely braking hard would not be sufficient to avoid the collision. Another example of a vehicle event that includes a combination of actions may be a lane change followed (within a predetermined window of time) by hard braking, which may indicate a poor decision to initiate the lane change. Another example of a vehicle event that includes a combination of actions may be a lane change followed (within a predetermined window of time) by a maneuver performed by a nearby vehicle (e.g., hard braking or swerving), which may indicate a nearby vehicle operator was at least surprised by the lane change.

The one or more processors of the remote computing server and/or of individual sets of resources may be configured to execute one or more computer program components. The computer program components may include one or more of a presentation component, an interface component, a distribution component, a report component, a stream component, a vehicle detection component, a parameter determination component, an event detection component, a storage component, a monetization component, a simulation component, and/or other components.

The presentation component may be configured to facilitate presentation of user interfaces, reports, detected vehicle events, information regarding physical surroundings of vehicles, and/or results to users, third parties, and/or vehicle operators. In some implementations, the presentation component may facilitate presentation, e.g., of a user interface, to a user of the remote computing server. In some implementations, the presentation component may facilitate presentation, e.g., of one or more user interfaces, to one or more vehicle operators. In some implementations, the presentation component may facilitate presentation, e.g., of one or more reports, results, and/or user interfaces, to a third party.

The interface component may be configured to facilitate interaction with users. For example, the interface component may facilitate interaction through user interfaces. For example, the interface component may receive user input through a user interface. In some implementations, the interface component may receive user input from the user of a remote computing server. In some implementations, the interface component may receive user input from vehicle operators. In some implementations, the interface component may receive user input from a third party.

The distribution component may be configured to transmit information to and/or from the remote computing server, from and/or to all or part of a fleet of vehicles. In some implementations, the distribution component may be configured to transmit information from the remote computing server to all or part of the transceivers that are included in and/or carried by a fleet of vehicles. In some implementations, the distribution component may be configured to transmit information to the remote computing server from all or part of the transceivers that are included in and/or carried by a fleet of vehicles. In some implementations, transmission may be wireless. In some implementations, transmission may be point-to-point. In some implementations, transmission may be broadcast. In some implementations, transmission may be bi-directional. For example, the distribution component may be configured to transmit queries and/or executable code from the remote computing server to individual vehicles in a fleet, e.g., based on the current locations of the individual vehicles. For example, individual transceivers may be configured to receive queries and/or executable code transmitted by the distribution component. In some implementations, the presentation component, interface component, and/or one or more other components of the system may be configured to determine and/or present one or both of warnings and/or recommendations to a vehicle operator.

The parameter determination component may be configured to derive, determine, and/or otherwise generate physical surroundings in which individual vehicles are operating, current operating conditions of individual vehicles, and/or vehicle parameters of individual vehicles. Operation of the parameter determination component may be based on the information conveyed by the output signals from the sensors and/or other information.

Physical surroundings of an individual vehicle may include static parameters (e.g., related to objects that are static), dynamic parameters (e.g., related to objects that are dynamic), and/or other parameters. For example, static parameters may include parameters related to roadside objects, roadside infrastructure (bridges, cross streets, signage, railroad crossings, etc.), and/or other parameters. For example, the dynamic parameters may include speed parameters of the individual vehicle, speed parameters of other vehicles, distance parameters, positional parameters, roadway parameters (e.g., related to the local surface of the road), and/or other parameters.

The one or more current operating conditions may be related to the vehicle, the operation of the vehicle, physical characteristics of the vehicle, and/or other information. In some implementations, the parameter determination component may be configured to determine one or more of the current operating conditions one or more times in an ongoing manner during operation of the vehicle. In some implementations, the parameter determination component may be configured to determine one or more of the parameters one or more times in an ongoing manner during operation of the vehicle.

The event detection component may be configured to detect vehicle events. In some implementations, vehicle events may be related to current operating conditions of a vehicle. In some implementations, vehicle events may be related to the physical surroundings of a vehicle. In some implementations, vehicle events may be related to the operator of a vehicle. For example, a vehicle event may be based on comparing one or more vehicle parameters with one or more thresholds. By way of non-limiting example, a vehicle event may be any event of interest to a vehicle operator, a fleet owner or operator, and/or an entity interested in the vehicle, its route, or its contents/cargo.

The vehicle detection component may be configured to determine and/or detect one or more vehicles in the proximity of a particular vehicle. In some implementations, nearby vehicles may be detected in the same lane as a particular vehicle, e.g., in front of and/or behind the particular vehicle. In some implementations, nearby vehicles may be detected in a different lane than a particular vehicle, e.g., next to the particular vehicle. For example, the different lane may be adjacent to the current lane of a particular vehicle. For example, the different lane may be non-parallel to the current lane of a particular vehicle. In some implementations, the vehicle detection component may be configured to determine and/or detect characteristics of nearby vehicles, the operation of nearby vehicles, the operators of nearby vehicles, and/or other information related to nearby vehicles.

The storage component may be configured to store information in electronic storage. For example, the information may be stored in the electronic storage of a particular vehicle. In some implementations, the stored information may be related to detected vehicle events, determined vehicle parameters, executable code, and/or other information. In some implementations, the storage component may be configured to store vehicle event records of detected vehicle events in electronic storage.

The report component may be configured to generate event reports associated with one or more of generated output signals, detected vehicle events, information regarding physical surroundings of vehicles, responses to queries, results from executable code, and/or other information. In some implementations, the report component may be configured to publish event reports, e.g. by posting it online or through other mechanisms that effectuate publication. In some implementations, the report component may be configured to transfer event reports to users, third parties, and/or other entities interested in one or more of the vehicles, their routes, or their contents/cargo. Event reports may include information captured by image sensors during detected vehicle events. In some implementations, event reports may include information that is derived from and/or based on information captured by image sensors during detected vehicle events.

The stream component may be configured to stream information from individual vehicles to the remote computing server. In some implementations, the streamed information may include one or more of generated output signals, detected vehicle events, information regarding physical surroundings of vehicles, responses to queries, results from executable code, and/or other information. In some implementations, generated and/or detected information may be streamed in real-time or near-real-time. In some implementations, information may be streamed after compression, filtering, and/or other processing to reduce the required amount of bandwidth.

The monetization component may be configured to exchange access by executable code to at least a part of the fleet for compensation. For example, the results from running executable code may be provided to the third party in exchange for compensation. In some implementations, the monetization component may be configured to exchange information related to detected vehicle events (and/or the physical surroundings of vehicles at that time) for compensation.

The simulation component may be configured to create a simulation scenario and/or model that mimics the physical surroundings of a particular vehicle at the time of a detected vehicle event involving the particular vehicle.

In some implementations, one or more components of the system may be configured to obtain, receive, and/or determine contextual information related to environmental conditions near and/or around vehicles. Environmental conditions may be related to weather conditions, traffic conditions, visibility, and/or other environmental conditions. In some implementations, one or more environmental conditions may be received from one or more sources external to the vehicle. For example, a source external to the vehicle may include an external provider.

In some implementations, detection of vehicle events may further be based one or more types of contextual information. In some implementations, detection may be accomplished and/or performed at the vehicle.

As used herein, any association (or relation, or reflection, or indication, or correspondency) involving vehicles, sensors, vehicle events, operating conditions, parameters, thresholds, functions, notifications, discrepancies, location-specific features, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other objects, features, and characteristics of the servers, systems, and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this disclosure, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
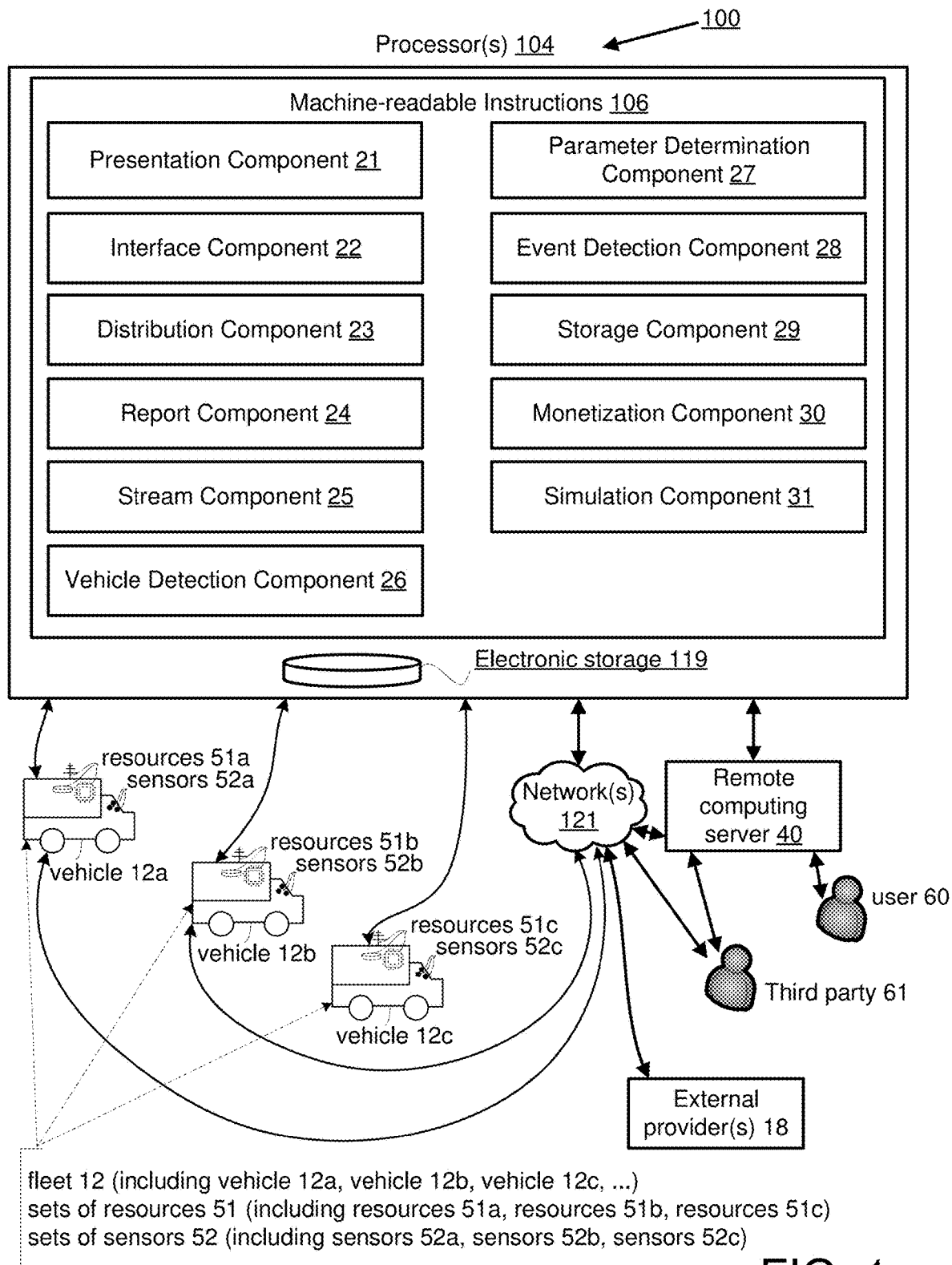
FIG. 1 illustrates a system configured to generate data describing physical surroundings of vehicles during operation, in accordance with one or more embodiments.

FIG. 1 illustrates a system 100 configured to generate data describing physical surroundings of vehicles during operation. The vehicles may form a fleet 12 of vehicles. Fleet 12 may include a first vehicle 12a, a second vehicle 12b, a third vehicle 12c, and so forth. As used here, the term fleet may refer to a set of at least 5 vehicles, at least vehicles, at least 100 vehicles, at least 1000 vehicles, and/or another number of vehicles. The number of vehicles depicted in FIG. 1 is not intended to be limiting.

Individual vehicles may include a set of resources for data processing and/or electronic storage, including but not limited to persistent storage. Individual vehicles may include a set of sensors configured to generate output signals conveying information related to the operation of the individual vehicles. System 100 may include sets of resources 51, sets of sensors 52, a remote computing server 40, electronic storage 119, and/or other components. In some implementations, system 100 may be a distributed data center, include a distributed data center, or act as a distributed data center.

One or more components of system 100 may include one or more processors 104 and/or other mechanisms/components for processing information. For example, a set of resources included in and/or carried by an individual vehicle may include one or more processors. For example, remote computing server 40 may include one or more processors. In some implementations, other vehicle-specific components, such as, by way of non-limiting example, a vehicle event recorder, may include one or more processors. In some implementations, some or all of the processors may be configured via machine-readable instructions to perform various functions. One or more components of system 100 may include electronic storage 119 and/or other mechanisms/components for storing information. For example, a set of resources included in and/or carried by an individual vehicle may include (local) electronic storage. For example, remote computing server 40 may include electronic storage. In some implementations, other vehicle-specific components, such as, by way of non-limiting example, a vehicle event recorder, may include electronic storage.

By way of non-limiting example, sets of resources 51 (e.g. set of resources 51c carried by vehicle 12c) may include electronic storage, a processor, a transceiver, an event recorder, and/or other vehicle-specific components. First vehicle 12a may carry a first set of resources 51a. Second vehicle 12b may carry a second set of resources 51b. Third vehicle 12c may carry a third set of resources 51c, and so forth. Each set of resources may include instances of electronic storage, a processor, a transceiver, an event recorder, and/or other vehicle-specific components. First set of resources 51a may include a first transceiver. Second set of resources 51b may include a second transceiver, and so forth. For example, first set of resources 51a may include first electronic storage, second set of resources 51b may include second electronic storage, third set of resources 51c may include third electronic storage, and so forth. For example, first set of resources 51a may include one or more processors, second set of resources 51b may include one or more processors, third set of resources 51c may include one or more processors, and so forth.

Transceivers may be configured to transfer and/or receive information to and/or from other elements of system 100, including but not limited to other vehicles (or components carried by other vehicles in fleet 12), remote computing server 40, a third party 61, and/or other components. In some implementations, transceivers may be configured to transfer and/or receive information wirelessly, and/or otherwise provide information-distribution resources. For example, a transceiver may be configured to receive executable code, such as code that includes and/or represents a definition of a particular vehicle event, a particular maneuver of a vehicle, and/or a particular condition of a vehicle operator of a vehicle. In some implementations, transceivers may be configured to obtain, receive, measure, and/or otherwise determine one or more conditions related to data transmissions. For example, one or more current local data transmission conditions may include a current bandwidth (e.g., in MB/s), a current transmission protocol (e.g., LTE, 3G, 4G, 5G, Wi-Fi, etc.), a current transmission cost (e.g., in $/MB), and/or other conditions.

Referring to FIG. 1, a set of sensors 52 may be configured to generate output signals conveying information. In some implementations, the generated information may be related to the operation of one or more vehicles in fleet 12. In some implementations, the generated information may be related to the physical surroundings of one or more vehicles in fleet 12. In some implementations, the generated information may be related to the circumstances around one or more vehicles in fleet 12. An individual set of sensors 52 may be carried by an individual vehicle. First vehicle 12a may carry a first set of sensors 52a. Second vehicle 12b may carry a second set of sensors 52b. Third vehicle 12c may carry a third set of sensors 52c, and so forth. The generated information may include timing information, location information, operator information, and/or other information. In some implementations, generated information may be associated with timing information (e.g., from a timer), location information, operator information, and/or other information.

In some implementations, timing information may associate and/or otherwise relate the generated output signals with one or more moments of generation by one or more particular sensors. For example, timing information may include time stamps that indicate moments of generation. For example, at a time labeled $t_1$ the speed of a vehicle may be 50 mph, at a time labeled $t_2$ the speed may be 55 mph, and so forth. A set of time stamps or moments in time may form a timeline. In some implementations, location information may associate and/or otherwise relate the generated output signals with one or more locations of generation (or, locations at the moment of generation) by one or more particular sensors. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources 51 may be configured to store generated information, timing information, location information, operator information, and/or other information, e.g. in electronic storage. In some implementations, information may be stored after compression, filtering, and/or other processing to reduce the required amount of storage space.

A sensor may be configured to generate output signals conveying information related to the operation of a vehicle. Information related to the operation of a vehicle may include feedback information from one or more of the mechanical systems of the vehicle, and/or other information. In some implementations, at least one of the sensors may be a vehicle system sensor included in an engine control module (ECM) system or an electronic control module (ECM) system of the vehicle. The sensors of a particular vehicle may be referred to as a set of sensors. An individual sensor is vehicle-specific.

Information related to current operating conditions of a vehicle may include feedback information from one or more of the mechanical systems of the vehicle, the electrical systems of the vehicle, and/or other information. The mechanical systems of a vehicle may include, for example, the engine, the drive train, the lighting systems (e.g., headlights, brake lights), the braking system, the transmission, fuel delivery systems, and/or other mechanical systems. The mechanical systems of a vehicle may include one or more mechanical sensors, electronic sensors, and/or other sensors that generate the output signals (e.g., seat belt sensors, tire pressure sensors, etc.). In some implementations, at least one of the sensors carried by a vehicle may be a vehicle system sensor included in an ECM system of the vehicle.

In some implementations, information related to current operating conditions of a vehicle may include information related to the environment in and/or around the vehicle. The vehicle environment may include spaces in and around an interior and an exterior of the vehicle. The information may include information related to movement of the vehicle, an orientation of the vehicle, a geographic position of the vehicle, a spatial position of the vehicle relative to other objects, a tilt angle of the vehicle, an inclination/declination angle of the vehicle, and/or other information. In some implementations, the output signals conveying information may be generated via non-standard aftermarket sensors installed in the vehicle. Non-standard aftermarket sensors may include, for example, a video camera, a microphone, an accelerometer, a gyroscope, a geolocation sensor (e.g., a GPS device), a radar detector, a magnetometer, radar (e.g. for measuring distance of leading vehicle), and/or other sensors. In some implementations, the set of sensors carried by a vehicle may include multiple cameras positioned around the vehicle and synchronized together to provide a 360-degree view of the interior of the vehicle (e.g., the cabin) and/or a 360-degree view of the exterior of the vehicle.

Although individual sets of sensors 52a, 52b, and 52c are depicted in FIG. 1 as having three elements, this is not intended to be limiting. For individual vehicles, a set of sensors 142 may include one or more sensors located adjacent to and/or in communication with the various mechanical systems of the vehicle, in one or more positions (e.g., at or near the front of the vehicle, at or near the back of the vehicle, on the side of the vehicle, on or near the windshield of the vehicle, facing outward and/or inward, etc.) to accurately acquire information representing the vehicle environment (e.g. visual information, spatial information, orientation information), and/or in other locations. For example, in some implementations, a set of sensors for a particular vehicle may be configured such that a first sensor is located near or in communication with a rotating tire of the vehicle, and a second sensor located on top of the vehicle is in communication with a geolocation satellite.

Individual sensors may be configured to generate output signals conveying information. The information may include visual information, motion-related information, position-related information, biometric information, heat-related information, infra-red information, and/or other information. In some implementations, one or more components of system 100 may determine one or more parameters that are measured, derived, estimated, approximated, and/or otherwise determined based on one or more output signals generated by one or more sensors.

Output signals generated by individual sensors (and/or information based thereon) may be stored and/or transferred in electronic files. In some implementations, output signals generated by individual sensors (and/or information based thereon) may be streamed to one or more other components of system 100.

Individual sensors may include image sensors, cameras, and/or other sensors. Individual sensors may be configured to capture information, including but not limited to visual information, video information, audio information, heat information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer, GPS unit, or other sensor. Output signals generated by individual image sensors (and/or information based thereon) may be stored and/or transferred in electronic files.

System 100 may be coupled to individual vehicles. For example, system 100 may be communicatively coupled to individual vehicles and/or to components carried by individual vehicles, including but not limited to transceivers. For example, components of system 100 may be configured to communicate through one or more networks 121. The one or more networks 121 may, by way of non-limiting example, include the internet.

Remote computing server 40 may include one or more processors 104. Remote computing server 40 may be remote, separate, and/or discrete from the fleet of vehicles 12. Remote computer server 40 may be physically unconnected to any vehicle in the fleet. One or more processors 104 may be configured via machine-readable instructions 106 to perform various functions. Remote computing server 40 may be configured to facilitate presentation of a user interface to a user 60 of remote computing server 40 and/or third party 61. The user interface may be configured to facilitate interaction between one or more users and remote computing server 40. For example, the user interface may be configured to receive user input from user 60 and/or third party 61. In some implementations, the received input may represent executable code, which may include one or more queries, definitions, and/or algorithms for particular vehicle events, particular maneuvers of vehicles, and/or particular conditions of vehicle operators. In some implementations, the received input may represent a query, e.g. a distributed query. The query may be related to information stored on electronic storage, e.g. in multiple sets of resources of multiple vehicles. Alternatively, and/or simultaneously, a query may be related to one or more vehicle operators. Remote computing server 40 may be further configured to transmit information (e.g., executable code, and/or a query) to some vehicles in the fleet or to all vehicles of the fleet. Results and/or other responses from individual vehicles may be received, aggregated, and/or presented by remote computing server 40.

In some implementations, a set of resources included in and/or carried by an individual vehicle may include an event recorder (also referred to as vehicle event recorder). For example, set of resources 51c carried by the vehicles may include an event recorder. An event recorder may be configured to generate, detect, identify, capture, and/or record information related to the operation of a vehicle. Information related to a vehicle may include, by way of non-limiting example, information related to and/or based on vehicle events. An event recorder may be configured to off-load and/or otherwise transmit information (e.g. through use of a transceiver). In some implementations, an event recorder may include one or more physical processors, electronic storage, and/or other components. In some implementations, an event recorder may detect vehicle events based on a comparison of the information conveyed by the output signals from one or more sensors to predetermined (variable and/or fixed) values, threshold, functions, and/or other information. In some implementations, detections by the event recorder may be based, at least in part, on information included in executable code and/or other information received from a third party. An event recorder may identify vehicle events in real-time or near real-time during operation of a vehicle.

Referring to FIG. 1, one or more processors 104 of remote computing server 40 and/or of individual sets of resources 51 may be configured to execute one or more computer program components. The computer program components may include one or more of a presentation component 21, an interface component 22, a distribution component 23, a report component 24, a stream component 25, a vehicle detection component 26, a parameter determination component 27, an event detection component 28, a storage component 29, a monetization component 30, a simulation component 31, and/or other components.

Presentation component 21 may be configured to facilitate presentation of user interfaces, reports, detected vehicle events, information regarding physical surroundings of vehicles, and/or results to users, third parties, and/or vehicle operators. In some implementations, presentation component 21 may facilitate presentation, e.g., of a user interface, to user 60 of remote computing server 40. In some implementations, presentation component 21 may facilitate presentation, e.g., of a user interface, to one or more vehicle operators. In some implementations, presentation component 21 may facilitate presentation, e.g., of one or more reports, results, and/or user interfaces, to third party 61. This enables information to be communicated between a vehicle operator and/or other components of system 100. As an example, a warning regarding a dangerous driving maneuver and/or vehicle event may be displayed to the driver of the vehicle via such a user interface, e.g. as a notification. Presentation component 21 enables information to be communicated between third party 61 and/or other components of system 100.

Examples of interface devices suitable for inclusion in a user interface include a keypad, buttons, switches, a keyboard, knobs, levers, a display screen, a touch screen, speakers, a microphone, an indicator light, an audible alarm, a printer, a tactile feedback device, and/or other interface devices. It is to be understood that other communication techniques, either hard-wired or wireless, are also contemplated by the present disclosure as a user interface. Other exemplary input devices and techniques adapted for use by users and/or vehicle operators include, but are not limited to, an RS-232 port, RF link, an IR link, modem (telephone, cable, and/or other modems), a cellular network, a Wi-Fi network, a local area network, and/or other devices and/or systems. In short, any technique for communicating information is contemplated by the present disclosure as a user interface.

Interface component 22 may be configured to facilitate interaction with users and/or vehicle operators. For example, a user may be a fleet manager, or someone investigating fleet operations. Interface component 22 may facilitate interaction through user interfaces. For example, interface component 22 may receive user input through a user interface. In some implementations, interface component 22 may receive user input from user 60 of remote computing server 40. In some implementations, interface component 22 may receive user input from third party 61, e.g. via remote computing server 40. In some implementations, the received user input may represent a distributed query, executable code, and/or other information. For example, an entire fleet of vehicles 12 (or any subset thereof) may be queried for particular information. In some implementations, a distributed query or other request may be associated with one or more response constraints. For example, distribution component 23 may be configured to transmit the one or more response constraints to all or part of fleet of vehicles 12.

In some implementations, interface component 22 may be configured to effectuate a review presentation to a user or reviewer, e.g. user 60. A review presentation may be based on information related to one or more detected vehicle events. In some implementations, a review presentation may provide a prompt to a user or reviewer to provide manual review input, e.g., regarding one or more detected vehicle events. For example, a reviewer may be prompted via a question, an inquiry, and/or via other types of prompts. For example, a reviewer may be asked whether a driver was wearing a seatbelt at a particular point in time, or whether one or more lanes appear to be closed, or whether the driver is a nearby vehicle had his eyes on the road. A review presentation may be implemented as a user interface to facilitate interaction for a reviewer. For example, such a user interface may receive review input from a reviewer, including but not limited to manual review input. In some implementations, review input may be responsive to a prompt. In some implementations, a vehicle operator may receive information based on review input. Such information may be referred to as feedback. For example, a user interface for a vehicle operator (this may be referred to as a driver interface) may present a message to a vehicle operator to "remember to wear your seatbelt," responsive to particular review input received from a reviewer (through a different user interface). In some implementations, a driver interface may be configured to detect a vehicle operator's response and/or reaction to specific feedback. In some implementations, the response and/or reaction by a vehicle operator may be specific to the feedback received through the driver interface. In some implementations, review input may be used to update and/or change a vehicle event report.

Distribution component 23 may be configured to transmit information to and/or from remote computing server 40 from and/or to all or part of fleet of vehicles 12. In some implementations, distribution component 23 may be configured to transmit information from remote computing server 40 to all or part of the transceivers that are included in and/or carried by fleet of vehicles 12. In some implementations, distribution component 23 may be configured to transmit information to remote computing server 40 from all or part of the transceivers that are included in and/or carried by fleet of vehicles 12. In some implementations, transmission may be wireless. In some implementations, transmission may be point-to-point. In some implementations, transmission may be broadcast. In some implementations, transmission may be bi-directional. For example, distribution component 23 may be configured to transmit executable code from remote computing server 40 to individual vehicles in a fleet, e.g., based on the current locations of the individual vehicles. For example, distribution component 23 may be configured to transmit result of a query to remote computing server 40 from some or all of the vehicles in fleet 12. In some implementations, presentation component 21, interface component 22, and/or one or more other components of system 100 may be configured to determine and/or present one or both of warnings and/or recommendations to a vehicle operator, wherein the warnings and/or recommendations are determined based on detected vehicle events and/or other information.

Parameter determination component 27 may be configured to derive, determine, and/or otherwise generate physical surroundings in which individual vehicles are operating, current operating conditions of individual vehicles, and/or vehicle parameters of individual vehicles. Operation of parameter determination component 27 may be based on the information conveyed by the output signals from the sensors and/or other information. Operation of parameter determination component 27 may occur over time, in an ongoing manner, intermittently, and/or otherwise spanning a period of time.

Physical surroundings of an individual vehicle may include static parameters (e.g., related to objects that are static), dynamic parameters (e.g., related to objects that are dynamic), and/or other parameters. For example, static parameters may include parameters related to roadside objects, roadside infrastructure (bridges, cross streets, signage, railroad crossings, potholes, etc.), and/or other parameters. For example, the dynamic parameters may include speed parameters of the individual vehicle, speed parameters of other vehicles, distance parameters, positional parameters, roadway parameters (e.g., related to the local surface of the road, such as the type of road surface, water/ice/snow on the road, slickness of the road, potholes in the road, etc.), and/or other parameters.

Figure 2:
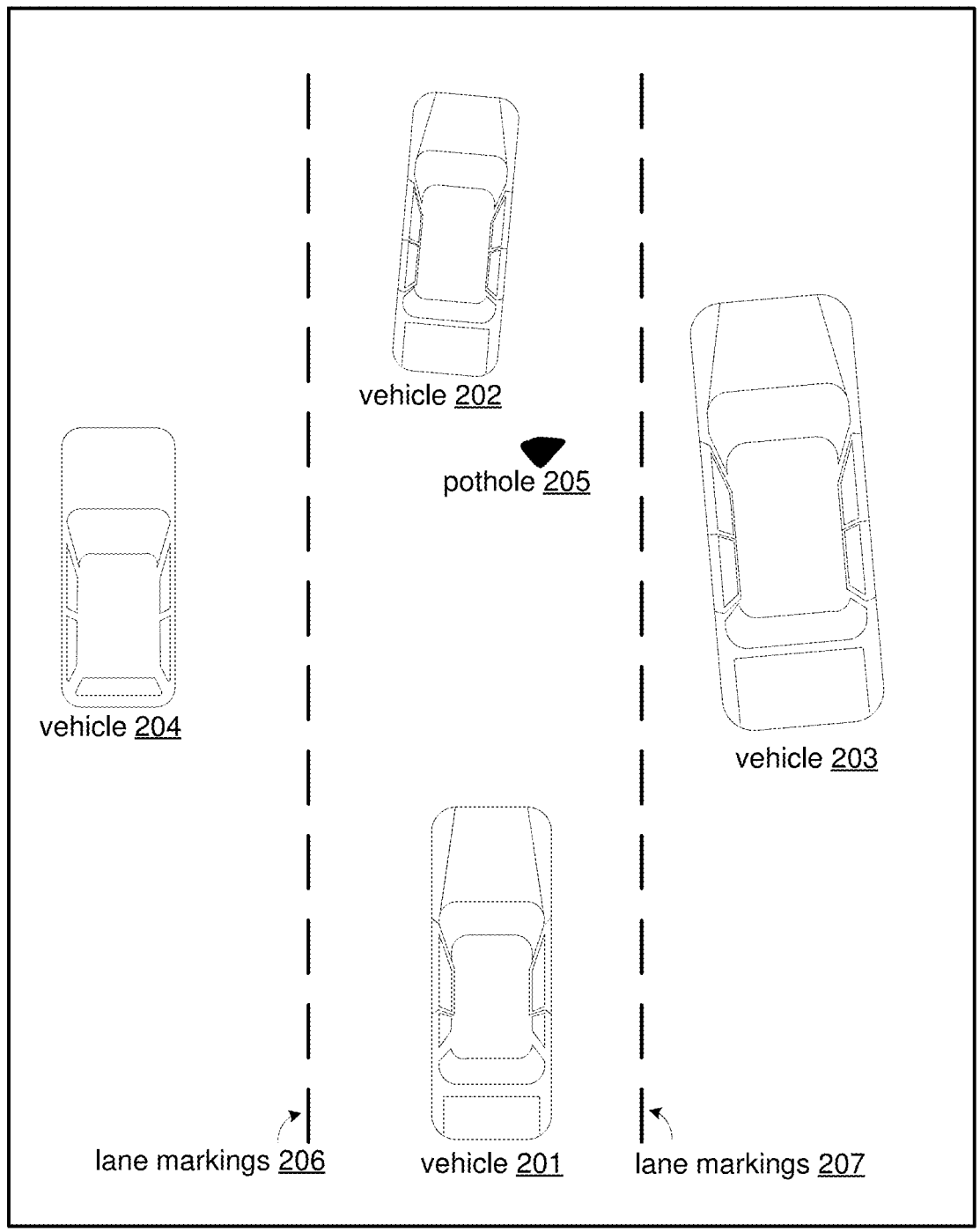
FIG. 2 illustrates an exemplary scenario in which a vehicle equipped with a system configured to generate data describing physical surroundings of the vehicle during operation may be used, in accordance with one or more embodiments.

By way of non-limiting example, FIG. 2 illustrates an exemplary scenario 200, shown in a top view, in which a vehicle 201 equipped with a system similar to system 100 may be used to generate data describing physical surroundings of vehicle 201 during real-world operation. In the same lane as vehicle 201 is a vehicle 202. In the lane to the right is a vehicle 203, and in the lane to the left is a vehicle 204. Assume all vehicles are heading in the same direction. The lanes are marked by lane markings 206 and lane markings 207. The center lane includes a static object, pothole 205. Scenario 200 represents a snapshot of a real-world sequence or timeline in which each vehicle travels independently. The system may be used to determine, e.g., the speed of vehicle 201, and the relative speeds of vehicle 202, vehicle 203, and vehicle 204. Additionally, distances between the vehicles may be determined. In some implementations, other vehicle characteristics, such as size, make, model, color, license plate, characteristics of the vehicle operator, number of passengers, apparent damage may be determined, by vehicle detection component 26, parameter determination component 27, and/or one or more other components of system 100.

For example, the physical surroundings of a particular vehicle in operation may include one or more of a first distance to the vehicle in front of the particular vehicle, a second distance to the vehicle behind the particular vehicle, a third distance to the nearest vehicle in the adjacent lane to the right, a fourth distance to the nearest vehicle in the adjacent lane to the left, a fifth distance to a pothole in front of the vehicle, a sixth distance to lane markings near the right side of the particular vehicle, a seventh distance to lane markings near the left side of the particular vehicle, an eight distance between the nearest two vehicles in the adjacent lane to the right, a ninth distance between the nearest two vehicles in the adjacent lane to the left, a tenth distance between the nearest vehicle in the adjacent lane to the right and the lane markings between that vehicle and the particular vehicle, an eleventh distance between the nearest vehicle in the adjacent lane to the left and the lane markings between that vehicle and the particular vehicle, and/or other distances. These distances may be determined and/or derived in an ongoing manner, such that a timeline for each individually may be created and/or recreated, as well as for the combination of some or all of them.

For example, the physical surroundings of a particular vehicle in operation may include one or more of a first speed (relative and/or absolute) of the vehicle in front of the particular vehicle, a second speed (relative and/or absolute) to the vehicle behind the particular vehicle, a third speed (relative and/or absolute) to the nearest vehicle in the adjacent lane to the right, a fourth speed (relative and/or absolute) to the nearest vehicle in the adjacent lane to the left, and/or other speed parameters. For example, the physical surroundings of a particular vehicle in operation may include one or more of a first heading (relative and/or absolute) of the vehicle in front of the particular vehicle, a second heading (relative and/or absolute) to the vehicle behind the particular vehicle, a third heading (relative and/or absolute) to the nearest vehicle in the adjacent lane to the right, a fourth heading (relative and/or absolute) to the nearest vehicle in the adjacent lane to the left, and/or other heading parameters. For example, the physical surroundings of a particular vehicle in operation may include one or more of a first acceleration (relative and/or absolute) of the vehicle in front of the particular vehicle, a second acceleration (relative and/or absolute) to the vehicle behind the particular vehicle, a third acceleration (relative and/or absolute) to the nearest vehicle in the adjacent lane to the right, a fourth acceleration (relative and/or absolute) to the nearest vehicle in the adjacent lane to the left, and/or other acceleration parameters. These speeds, headings and/or accelerations may be determined and/or derived in an ongoing manner, such that a timeline for each individually may be created and/or recreated, as well as for the combination of some or all of them.

Figure 3:
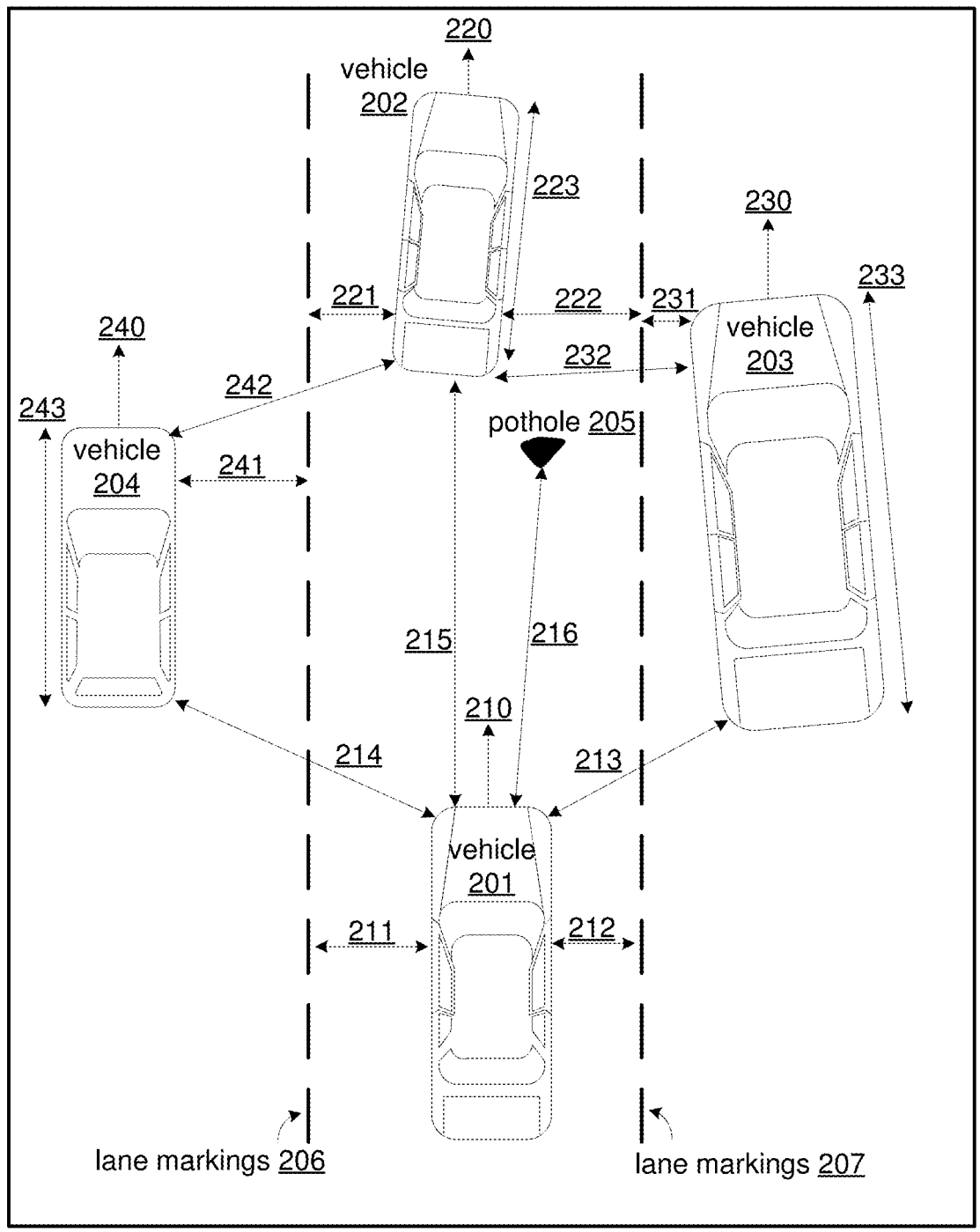
FIG. 3 illustrates an exemplary scenario in which a vehicle equipped with a system configured to generate data describing physical surroundings of the vehicle during operation is used, in accordance with one or more embodiments.

By way of non-limiting example, FIG. 3 illustrates an exemplary scenario 300, shown in a top view, in which vehicle 201 equipped with a system similar to system 100 may be used to generate data describing physical surroundings of vehicle 201 during real-world operation. By way of non-limiting example, scenario 300 includes the same vehicles as scenario 200 of FIG. 2. Vehicle 201 has a particular speed, heading, and acceleration indicated by element 210. Likewise, vehicles 202, 203, and 204 have their speeds, headings, and accelerations as indicated by elements 220, 230, and 240, respectively. The distance between vehicle 201 and vehicle 202 is indicated by element 215. The distance between vehicle 202 and vehicle 203 is indicated by element 232. The distance between vehicle 202 and vehicle 204 is indicated by element 242. The distances from vehicle 201 to lane markings 206 and lane markings 207 are indicated by elements 211 and 212, respectively. The distances from vehicle 202 to lane markings 206 and lane markings 207 are indicated by elements 221 and 222, respectively. The distance from vehicle 201 to pothole 205 is indicated by element 216. The distance between vehicle 203 and lane markings 207 is indicated by element 231. The distance between vehicle 204 and lane markings 206 is indicated by element 241. The sizes of vehicles 202, 203, and 204 are indicated by elements 223, 233, and 243, respectively. The physical surroundings of vehicle 201 are not limited to the two-dimensional depiction in FIGS. 2 and 3. Rather, the physical surroundings of vehicle 201 may be three-dimensional. A set of image sensors may provide 360-degree visual information around vehicle 201 over time, including any of the parameters and/or conditions described here as part of the physical surroundings, as well as other parameters and/or conditions described herein. By determining, deriving, and/or otherwise generating this information at the time of a detected vehicle event, a simulation scenario may be created that is similar to the circumstances that lead to the detected vehicle event. Such a simulation scenario may be used to train and/or test vehicle operators and/or autonomous driving algorithms.

In some implementations, information representing the physical surroundings may be determined in post-processing, e.g. at remote computing server 40. For example, using computer vision techniques, previously captured visual information of a particular vehicle event that occurred in the past may be analyzed (e.g., frame by frame) to approximate one or more parameters that are part of the physical surroundings of that particular vehicle event.

Referring to FIG. 1, the one or more current operating conditions may be related to the vehicle, the operation of the vehicle, physical characteristics of the vehicle, and/or other information. In some implementations, parameter determination component 27 may be configured to derive, determine, and/or otherwise generate one or more of the current operating conditions one or more times in an ongoing manner during operation of the vehicle.

In some implementations, operating conditions may include vehicle parameters. For example, vehicle parameters may be related to one or more of an acceleration, a direction of travel, a turn diameter, a vehicle speed, an engine speed (e.g. RPM), a duration of time, a closing distance, a lane departure from an intended travelling lane of the vehicle, a following distance, physical characteristics of the vehicle (such as mass and/or number of axles, for example), a tilt angle of the vehicle, an inclination/declination angle of the vehicle, and/or other parameters.

The physical characteristics of a vehicle may be physical features of a vehicle set during manufacture of the vehicle, during loading of the vehicle, and/or at other times. For example, the one or more vehicle parameters may include a vehicle type (e.g., a car, a bus, a semi-truck, a tanker truck), a vehicle size (e.g., length), a vehicle weight (e.g., including cargo and/or without cargo), a number of gears, a number of axles, a type of load carried by the vehicle (e.g., food items, livestock, construction materials, hazardous materials, an oversized load, a liquid), vehicle trailer type, trailer length, trailer weight, trailer height, a number of axles, and/or other physical characteristics and/or features.

In some implementations, parameter determination component 27 may be configured to derive, determine, and/or otherwise generate one or more vehicle parameters based on the output signals from at least two different sensors. For example, parameter determination component 27 may derive, determine, and/or otherwise generate one or more of the vehicle parameters based on output signals from a sensor related to the ECM system and an external aftermarket added sensor. In some implementations, a determination of one or more of the vehicle parameters based on output signals from at least two different sensors may be more accurate and/or precise than a determination based on the output signals from only one sensor. For example, on an icy surface, output signals from an accelerometer may not convey that a driver of the vehicle is applying the brakes of the vehicle. However, a sensor in communication with the braking system of the vehicle would convey that the driver is applying the brakes. A value of a braking parameter may be determined based on the braking sensor information even though the output signals from the accelerometer may not convey that the driver is applying the brakes.

Parameter determination component 27 may be configured to derive, determine, and/or otherwise generate vehicle parameters that are not directly measurable by any of the available sensors. For example, an inclinometer may not be available to measure the road grade, but vehicle speed data as measured by a GPS system and/or by a wheel sensor ECM may be combined with accelerometer data to determine the road grade. If an accelerometer measures a force that is consistent with braking, but the vehicle speed remains constant, the parameter component can determine that the measured force is a component of the gravity vector that is acting along the longitudinal axis of the vehicle. By using trigonometry, the magnitude of the gravity vector component can be used to determine the road grade (e.g., pitch angle of the vehicle in respect to the horizontal plane).

In some implementations, one or more of the vehicle parameters may be determined one or more times in an ongoing manner during operation of the vehicle. In some implementations, one or more of the vehicle parameters may be determined at regular time intervals during operation of the vehicle. The timing of the vehicle parameter determinations (e.g., in an ongoing manner, at regular time intervals, etc.) may be programmed at manufacture, obtained responsive to user entry and/or selection of timing information via a user interface and/or a remote computing device, and/or may be determined in other ways. The time intervals of parameter determination may be significantly less (e.g. more frequent) than the time intervals at which various sensor measurements are available. In such cases, parameter determination component 27 may estimate vehicle parameters in between the actual measurements of the same vehicle parameters by the respective sensors, to the extent that the vehicle parameters are measurable. This may be established by means of a physical model that describes the behavior of various vehicle parameters and their interdependency. For example, a vehicle speed parameter may be estimated at a rate of 20 times per second, although the underlying speed measurements are much less frequent (e.g., four times per second for ECM speed, one time per second for GPS speed). This may be accomplished by integrating vehicle acceleration, as measured by the accelerometer sensor where the measurements are available 1000 times per second, across time to determine change in speed that is accumulated over time again for the most recent vehicle speed measurement. The benefit of these more frequent estimates of vehicle parameters are many and they include improved operation of other components of system 100, reduced complexity of downstream logic and system design (e.g., all vehicle parameters are updated at the same interval, rather than being updating irregularly and at the interval of each respective sensor), and more pleasing (e.g., "smooth") presentation of vehicle event recorder data through a user interface.

In some implementations, parameter determination component 27 may be configured to adjust how detailed the determination of the physical surroundings is, e.g. as controlled through user-controlled input. For example, a user may set or provide one or more response constraints that are related to the operation of parameter determination component 27 (and/or other components of system 100). For example, a first type of vehicle event may merely require a lower level of details for the determination of the physical surroundings, whereas a second type of vehicle event may merely require a higher level of details for the determination of the physical surroundings (which will require more memory to store and/or more bandwidth to transfer than for the first type of vehicle event).

Event detection component 28 may be configured to detect vehicle events. In some implementations, vehicle events may be related to current operating conditions of a vehicle. In some implementations, vehicle events may be related to the physical surroundings of a vehicle. In some implementations, vehicle events may be related to the operator of a vehicle. For example, a vehicle event may be based on comparing one or more vehicle parameters with one or more thresholds. In some implementations, detections may be based on definitions and/or representations of vehicle events, actions and/or conditions of vehicle operators, and/or vehicle maneuvers that are included in executable code. For example, particular executable code from third party 61 may include a definition for the detection of an event that represents an inattentive vehicle operator. Such executable code may be distributed across a fleet of vehicles, and results from the detection of an occurrence of the event that represents an inattentive vehicle operator may be transferred to remote computing server 40, and may be presented to third party 61.

For example, particular executable code from user 60 may include a definition for the detection of an event that represents a fatigued vehicle operator. Such executable code may be distributed across a fleet of vehicles, and results from the detection of an occurrence of the event that represents a fatigued vehicle operator may be transferred to remote computing server 40, and presented to user 60. For example, third party 61 may test and/or compare different algorithms to detect a fatigued vehicle operator. In some implementations, system 100 may be configured to support A/B testing between different algorithms to detect similar events, e.g. to determine algorithm performance under controlled conditions. In some implementations, results from different algorithms (e.g., a default algorithm to detect a fatigued driver and an alternative algorithm to detect a fatigued driver) may be presented to one or more manual reviewers, e.g. for head-to-head comparisons of one or more results. In some implementations, presentation to reviewers (manual and/or otherwise) may be accomplished through user interfaces. For example, a manual reviewer may be able to enter feedback into a user interface as part of a review.

For example, particular executable code from third party 61 may include a definition for the detection of an event that represents a fuel-inefficient maneuver of a vehicle. Such executable code may be distributed across a fleet of vehicles, and results from the detection of an occurrence of the event that represents a fuel-inefficient maneuver may be transferred to remote computing server 40, and subsequently presented.

In some implementations, event detection component 28 may be configured to detect specific driving maneuvers based on one or more of a vehicle speed, an engine load, a throttle level, an accelerator position, vehicle direction, a gravitational force, and/or other parameters being sustained at or above threshold levels for pre-determined amounts of time. In some implementations, an acceleration and/or force threshold may be scaled based on a length of time an acceleration and/or force is maintained, and/or the particular speed the vehicle is travelling. Event detection component 28 may be configured such that force maintained over a period of time at a particular vehicle speed may decrease a threshold force the longer that the force is maintained. Event detection component 28 may be configured such that, combined with engine load data, throttle data may be used to determine a risky event, a fuel wasting event, and/or other events.

Vehicle detection component 26 may be configured to determine and/or detect one or more vehicles in the proximity of a particular vehicle. In some implementations, nearby vehicles may be detected in the same lane as a particular vehicle, e.g., in front of and/or behind the particular vehicle. In some implementations, nearby vehicles may be detected in a different lane than a particular vehicle, e.g., next to the particular vehicle. For example, the different lane may be adjacent to the current lane of a particular vehicle. For example, the different lane may be non-parallel to the current lane of a particular vehicle (e.g., a cross street, merging lane, on-ramp, etc.). In some implementations, vehicle detection component 26 may be configured to determine and/or detect characteristics of nearby vehicles, the operation of nearby vehicles, the operators of nearby vehicles, and/or other information related to nearby vehicles. In some implementations, operation of vehicle detection component 26 may be based, at least in part, on the use of computer vision techniques. For example, vehicle detection component 26 may be configured to determine and/or detect the make and model (and/or color, license plate, characteristics of the vehicle operator, number of passengers, apparent visible damage, etc. etc.) of a vehicle passing in the same or a different lane as a particular vehicle.

Storage component 29 may be configured to store information in electronic storage. For example, the information may be stored in the electronic storage of a particular vehicle. In some implementations, the stored information may be related to detected vehicle events, determined vehicle parameters, executable code, and/or other information. For example, stored information may be associated with detected vehicle events, and include information regarding the physical surroundings in which the particular vehicle was operating at the time of the detected vehicle events. In some implementations, storage component 29 may be configured to store vehicle event records of detected vehicle events in electronic storage.

Report component 24 may be configured to generate event reports associated with one or more of generated output signals, detected vehicle events, information regarding physical surroundings of vehicles, responses to queries, results from executable code, and/or other information. In some implementations, report component 24 may be configured to publish event reports, e.g. by posting it online or through other mechanisms that effectuate publication. In some implementations, report component 24 may be configured to transfer event reports to users, third parties, and/or other entities interested in one or more of the vehicles, their routes, or their contents/cargo. Event reports may include information captured by image sensors during detected vehicle events. In some implementations, event reports may include information that is derived from and/or based on information captured by image sensors during detected vehicle events.

Stream component 25 may be configured to stream information from individual vehicles to remote computing server 40. In some implementations, the streamed information may include one or more of generated output signals, detected vehicle events, information regarding physical surroundings of vehicles, responses to queries, results from executable code, and/or other information. In some implementations, generated and/or detected information may be streamed in real-time or near-real-time. In some implementations, information may be streamed after compression, filtering, and/or other processing to reduce the required amount of bandwidth.

Monetization component 30 may be configured to exchange access by executable code to at least a part of the fleet for compensation. For example, the results from running executable code may be provided to third party 61 in exchange for compensation. In some implementations, monetization component 30 may be configured to exchange information related to detected vehicle events (and/or the physical surroundings of vehicles at that time) for compensation.

Simulation component 31 may be configured to create a simulation (or simulation scenario) that mimics the physical surroundings of a particular vehicle at the time of a detected vehicle event involving the particular vehicle. In some implementations, simulation component 31 may be configured to create a simulation scenario that is similar to the circumstances that lead to the detected vehicle event. Such a simulation scenario may be used to train and/or test vehicle operators and/or autonomous driving algorithms.

In some implementations, one or more components of system 100 may be configured to obtain, receive, and/or determine contextual information related to environmental conditions near and/or around vehicles. Environmental conditions may be related to weather conditions, road surface conditions, traffic conditions, visibility (e.g., position of the sun, occurrence of fog, glare or reflections into the cabin of the vehicle, headlights of oncoming traffic, etc.), and/or other environmental conditions. In some implementations, environmental conditions may be related to proximity of certain objects that are relevant to driving, including but not limited to traffic signs, railroad crossings, time of day, ambient light conditions, altitude, and/or other objects relevant to driving. In some implementations, contextual information may include a likelihood of traffic congestion near a particular vehicle, and/or near a particular location. In some implementations, contextual information may include a likelihood of the road surface near a particular vehicle and/or a particular location being icy, wet, and/or otherwise potentially having an effect of braking. In some implementations, environmental conditions may include information related to a particular driver and/or a particular trip. For example, with every passing hour that a particular driver drives his vehicle during a particular trip, the likelihood of drowsiness may increase. In some implementations, the function between trip duration or distance and likelihood of drowsiness may be driver-specific.

In some implementations, one or more environmental conditions may be received from one or more sources external to the vehicle. For example, a source external to the vehicle may include one or more external providers 18. For example, contextual information related to weather conditions may be received from a particular external provider 18 that provides weather information. For example, contextual information related to road surface conditions may be received from a particular external provider 18 that provides road condition information. For example, contextual information related to traffic conditions may be received from a particular external provider 18 that provides traffic information.

In some implementations, detection of vehicle events may further be based one or more types of contextual information. In some implementations, detection may be accomplished and/or performed at the vehicle. In some implementations, a value of a current operating condition that effectuates detection of a vehicle event and/or determination of an event type may vary as a function of the contextual information. For example, a speed of 50 mph (in a particular geographical location) may not effectuate detection of a vehicle event and/or determination of an event type when the road surface is dry and/or when traffic is light, but the same speed in the same geographical location may effectuate detection of a vehicle event and/or determination of an event type responsive to contextual information and/or other information indicating that the road surface is wet and/or icy (and/or may be wet and/or icy), or responsive to contextual information (and/or other information) that traffic is heavy (and/or may be heavy). In this example, the contextual information (and/or other information) may have an effect of the detection of vehicle events and/or the determination of event types. In some implementations, contextual information (and/or other information) may modify the sensitivity of the process and/or mechanism by which vehicle events are detected and/or event types are determined. In some implementations, detection of vehicle events and/or determination of event types may be based on one or more comparisons of the values of current operating conditions with threshold values. In some implementations, a particular threshold value may vary as a function of contextual information. In some implementations, a particular threshold value may vary as a function of other information, e.g. as determined based on sensor output.

By way of non-limiting example, lateral forces of about −0.3 g (e.g., swerve left) and/or about +0.3 g (e.g., swerve right) may be a basis used to detect a swerve. In some implementations, the −0.3 g and/or +0.3 g criteria may be used at the vehicle speeds less than about 10 kph. The −0.3 g and/or +0.3 g criteria may be scaled as the vehicle increases in speed. In some implementations, the −0.3 g and/or +0.3 g criteria may be scaled (e.g., reduced) by about 0.0045 g per kph of speed over 10 kph. To prevent too much sensitivity, the lateral force criteria may be limited to about +/−0.12 g, regardless of the speed of the vehicle, for example. In some implementations, the criterion for the given period of time between swerves may be about 3 seconds.

Electronic storage 119 may comprise electronic storage media that electronically stores information. The electronic storage media of electronic storage 119 may comprise one or both of system storage that is provided integrally (i.e., substantially non-removable) with system 100 and/or removable storage that is removably connectable to system 100 via, for example, a port (e.g., a USB port, a firewire port, etc.) or a drive (e.g., a disk drive, etc.). Electronic storage 119 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 119 may store software algorithms, recorded video event data, information determined by processor 104, information received via a user interface, and/or other information that enables system 100 to function properly. Electronic storage 119 may be (in whole or in part) a separate component within system 100, or electronic storage 119 may be provided (in whole or in part) integrally with one or more other components of system 100.

As described above, processor 104 may be configured to provide information-processing capabilities in system 100. As such, processor 104 may comprise one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may comprise a plurality of processing units. These processing units may be physically located within the same device (e.g., a vehicle event recorder), or processor 104 may represent processing functionality of a plurality of devices operating in coordination.

Processor 110 may be configured to execute components 21-31 by software; hardware; firmware; some combination of software, hardware, and/or firmware; and/or other mechanisms for configuring processing capabilities on processor 110. It should be appreciated that although components 21-31 are illustrated in FIG. 1 as being co-located within a single processing unit, in implementations in which processor 104 comprises multiple processing units, one or more of components 21-31 may be located remotely from the other components. The description of the functionality provided by the different components 21-31 described herein is for illustrative purposes, and is not intended to be limiting, as any of components 21-31 may provide more or less functionality than is described. For example, one or more of components 21-31 may be eliminated, and some or all of its functionality may be provided by other components 21-31. As another example, processor 104 may be configured to execute one or more additional components that may perform some or all of the functionality attributed below to one of components 21-31.

Figure 4:
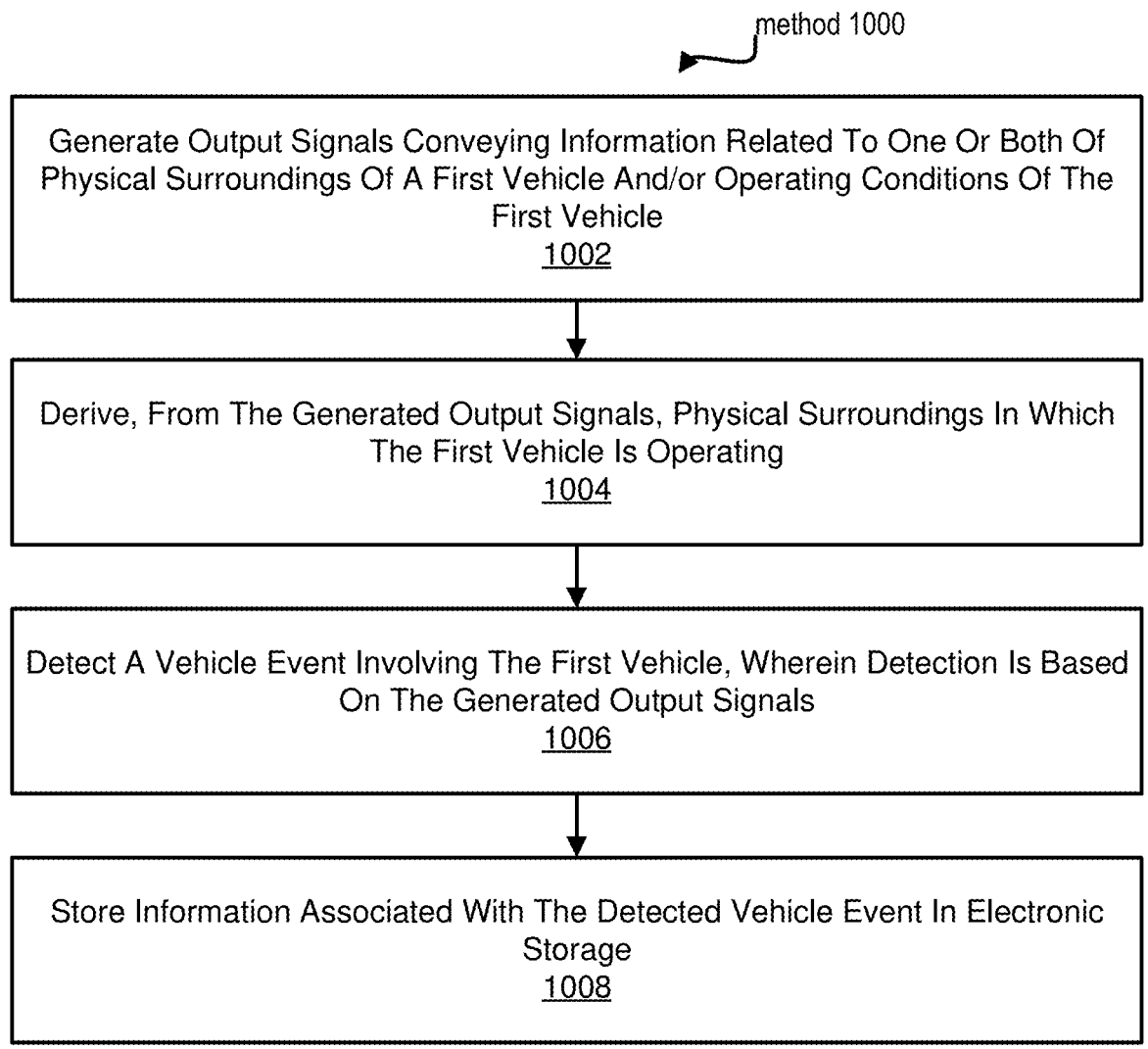
FIG. 4 illustrates a method to generate data describing physical surroundings of vehicles during operation, in accordance with one or more embodiments.

FIG. 4 illustrates a method 1000 to generate data describing physical surroundings of vehicles during operation. The operations of method 1000 presented below are intended to be illustrative. In some implementations, method 1000 may be accomplished with one or more additional operations not described, and/or without one or more of the operations discussed. Additionally, the order in which the operations of method 1000 are illustrated (in FIG. 4) and described below is not intended to be limiting. In some implementations, two or more of the operations may occur substantially simultaneously.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on one or more electronic storage mediums. The one or more processing devices may include one or more devices configured through hardware, firmware, and/or software to be specifically designed for execution of one or more of the operations of method 1000.

Referring to FIG. 4 and method 1000, at an operation 1002, output signals are generated conveying information related to one or both of the physical surroundings of a first vehicle and/or operating conditions of the first vehicle. In some embodiments, operation 1002 is performed by a set of sensors the same as or similar to set of sensors 52a (shown in FIG. 1 and described herein).

At an operation 1004, physical surroundings in which the first vehicle is operating are derived from the generated output signals. In some embodiments, operation 1004 is performed by a parameter determination component the same as or similar to parameter determination component 27 (shown in FIG. 1 and described herein).

At an operation 1006, a vehicle event is detected involving the first vehicle. Detection is based on the generated output signals. In some embodiments, operation 1006 is performed by an event detection component the same as or similar to event detection component 28 (shown in FIG. 1 and described herein).

At an operation 1008, information associated with the detected vehicle event is stored in electronic storage. In some embodiments, operation 1008 is performed by a storage component the same as or similar to storage component 29 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to generate simulation scenarios for simulating simulated vehicles, wherein the simulation scenarios mimic physical surroundings of a first vehicle, the system configured to couple with a fleet of vehicles including the first vehicle, the system comprising:
   electronic storage configured to electronically store information;
   a set of sensors carried by the first vehicle, wherein the set of sensors includes one or more image sensors, wherein the set of sensors is configured to generate output signals conveying information related to one or both of the physical surroundings of the first vehicle and/or operating conditions of the first vehicle; and
   one or more processors configured via machine-readable instructions to:
      derive, in an ongoing manner, from the generated output signals, the physical surroundings in which the first vehicle is operating, wherein the physical surroundings include:
         a first speed parameter representing a first speed of the first vehicle traveling in a first lane,
         a second speed parameter representing a second speed of a second vehicle traveling, in front of the first vehicle, in the first lane,
         a third speed parameter representing a third speed of a third vehicle traveling in a second lane to the right of the first lane,
         a fourth speed parameter representing a fourth speed of a fourth vehicle traveling in a third lane to the left of the first lane,
         a first distance parameter representing a first distance between the first vehicle and the second vehicle,
         a second distance parameter representing a second distance between the first vehicle and the third vehicle,
         a third distance parameter representing a third distance between the first vehicle and the fourth vehicle,
         a fourth distance parameter representing a fourth distance between the first vehicle and lane markings on the right side of the first vehicle,
         a fifth distance parameter representing a fifth distance between the first vehicle and lane markings on the left side of the first vehicle,
         a sixth distance parameter representing a sixth distance between the third vehicle and the lane markings on the right side of the first vehicle,
         a seventh distance parameter representing a seventh distance between the fourth vehicle and the lane markings on the left side of the first vehicle;
      detect a vehicle event involving the first vehicle, wherein detection is based on the generated output signals;
      store information associated with the detected vehicle event in the electronic storage;
      generate an event report describing the detected vehicle event, wherein the event report includes event information derived at the time of the detected vehicle event, wherein the event information is based on the first speed parameter, the second speed parameter, the third speed parameter, the fourth speed parameter, the first distance parameter, the second distance parameter, the third distance parameter, the fourth distance parameter, the fifth distance parameter, the sixth distance parameter, the seventh distance parameter, and information captured by the one or more image sensors at the time of the detected vehicle event; and
      automatically create, by a simulation component, based on the event report and the generated output signals, a simulation scenario for simulating a simulated vehicle by recreating timelines for the first speed parameter, the second speed parameter, the third speed parameter, the fourth speed parameter, the first distance parameter, the second distance parameter, the third distance parameter, the fourth distance parameter, the fifth distance parameter, the sixth distance parameter, and the seventh distance parameter in the simulation scenario, wherein the simulation scenario includes surroundings for the simulated vehicle that mimic the physical surroundings of the first vehicle at the time of the detected vehicle event such that the surroundings included in the simulation scenario include:
         a simulated second vehicle travelling at a simulated second speed that corresponds to the second speed parameter, wherein the simulated second vehicle has a simulated first distance from the simulated vehicle that corresponds to the first distance parameter,
         a simulated third vehicle traveling at a simulated third speed that corresponds to the third speed parameter, wherein the simulated third vehicle has a simulated second distance from the simulated vehicle that corresponds to the second distance parameter and a simulated sixth distance from lane markings on the right side of the simulated vehicle that corresponds to the sixth distance parameter,
         a simulated fourth vehicle traveling at a simulated fourth speed that corresponds to the fourth speed parameter, wherein the simulated fourth vehicle has a simulated third distance from the simulated vehicle that corresponds to the third distance parameter and a simulated seventh distance from lane markings on the left side of the simulated vehicle that corresponds to the seventh distance parameter.

2. The system of claim 1, wherein the physical surroundings include:
   one or more roadway parameters representing one or more characteristics of the roadway on which the first vehicle is operating.

3. The system of claim 1, wherein the one or more processors are further configured via machine-readable instructions to determine one or both of a make and/or a model of the second vehicle, and wherein the event report further includes information representing one or both of the make and/or the model of the second vehicle.

4. The system of claim 1, wherein the one or more processors are further configured via machine-readable instructions to determine one or more external conditions, wherein the one or more external conditions are related to one or more of local weather, local temperature, local precipitation, local visibility, and/or local ambient light, and wherein the stored information includes information representing the one or more external conditions.

5. The system of claim 1, wherein the one or more processors are further configured via machine-readable instructions to determine one or more external conditions, wherein the one or more external conditions are related to road surface, and wherein the stored information includes information representing the one or more external conditions.

6. The system of claim 1, wherein the one or more processors are further configured via machine-readable instructions to determine one or more external conditions, wherein the one or more external conditions are related to local weather conditions, and wherein the stored information includes information representing the one or more external conditions.

7. The system of claim 1, wherein the first vehicle includes a set of resources carried by the first vehicle, wherein the set of resources includes a first transceiver configured to transfer information from the first vehicle to a remote computing server, wherein the fleet of vehicles further includes a secondary vehicle that includes a second set of resources carried by the secondary vehicle, wherein the second set of resources includes a second transceiver configured to transfer information from the secondary vehicle to the remote computing server, wherein the one or more processors are further configured via machine-readable instructions to stream information, using the first transceiver, to the remote computing server, wherein the streamed information includes a representation of the generated output signals, wherein the system further includes:
the remote computing server including one or more physical processors configured by machine-readable instructions to:
receive the streamed information from the first transceiver of the first vehicle; and
receive a secondary stream of information from the second transceiver of the secondary vehicle, wherein the secondary stream of information includes a representation of sensor signals generated by a secondary set of sensors carried by the secondary vehicle.

8. The system of claim 1, wherein the one or more processors are further configured via machine-readable instructions to stream information, using a first transceiver carried by the first vehicle, to a remote computing server, wherein the streamed information includes a representation of the event report, and wherein the first transceiver is configured to transfer the information to the remote computing server.

9. A method for generating simulation scenarios for simulating simulated vehicles, wherein the simulation scenarios mimic physical surroundings of a first vehicle, wherein the first vehicle is included in a fleet of vehicles, the method comprising:
generating output signals conveying information related to one or both of the physical surroundings of the first vehicle and/or operating conditions of the first vehicle;
deriving, in an ongoing manner, from the generated output signals, physical surroundings in which the first vehicle is operating, wherein the physical surroundings include:
a first speed parameter representing a first speed of the first vehicle traveling in a first lane,
a second speed parameter representing a second speed of a second vehicle traveling, in front of the first vehicle, in the first lane,
a third speed parameter representing a third speed of a third vehicle traveling in a second lane to the right of the first lane,
a fourth speed parameter representing a fourth speed of a fourth vehicle traveling in a third lane to the left of the first lane,
a first distance parameter representing a first distance between the first vehicle and the second vehicle,
a second distance parameter representing a second distance between the first vehicle and the third vehicle,
a third distance parameter representing a third distance between the first vehicle and the fourth vehicle,
a fourth distance parameter representing a fourth distance between the first vehicle and lane markings on the right side of the first vehicle,
a fifth distance parameter representing a fifth distance between the first vehicle and lane markings on the left side of the first vehicle,
a sixth distance parameter representing a sixth distance between the third vehicle and the lane markings on the right side of the first vehicle,
a seventh distance parameter representing a seventh distance between the fourth vehicle and the lane markings on the left side of the first vehicle;
detecting a vehicle event involving the first vehicle, wherein detection is based on the generated output signals;
storing information associated with the detected vehicle event in electronic storage;
generating an event report describing the detected vehicle event, wherein the event report includes event information derived at the time of the detected vehicle event, wherein the event information is based on: the first speed parameter, the second speed parameter, the third speed parameter, the fourth speed parameter, the first distance parameter, the second distance parameter, the third distance parameter, the fourth distance parameter, the fifth distance parameter, the sixth distance parameter, the seventh distance parameter, and information captured by the one or more image sensors at the time of the detected vehicle event; and
automatically creating, by a simulation component, based on the event report and the generated output signals, a simulation scenario for simulating a simulated vehicle by recreating timelines for the first speed parameter, the second speed parameter, the third speed parameter, the fourth speed parameter, the first distance parameter, the second distance parameter, the third distance parameter, the fourth distance parameter, the fifth distance parameter, the sixth distance parameter, and the seventh distance parameter in the simulation scenario, wherein the simulation scenario includes surroundings for the simulated vehicle that mimic the physical surroundings of the first vehicle at the time of the detected vehicle event such that the surroundings included in the simulation scenario include:
a simulated second vehicle travelling at a simulated second speed that corresponds to the second speed parameter, wherein the simulated second vehicle has a simulated first distance from the simulated vehicle that corresponds to the first distance parameter,
a simulated third vehicle traveling at a simulated third speed that corresponds to the third speed parameter, wherein the simulated third vehicle has a simulated second distance from the simulated vehicle that corresponds to the second distance parameter and a simulated sixth distance from lane markings on the right side of the simulated vehicle that corresponds to the sixth distance parameter,
a simulated fourth vehicle traveling at a simulated fourth speed that corresponds to the fourth speed parameter, wherein the simulated fourth vehicle has a simulated third distance from the simulated vehicle that corresponds to the third distance parameter and a simulated seventh distance from lane markings on the left side of the simulated vehicle that corresponds to the seventh distance parameter.

10. The method of claim 9, further comprising:
determining, in an ongoing manner, one or more roadway parameters representing one or more characteristics of the roadway on which the first vehicle is operating;
wherein the physical surroundings further include the one or more roadway parameters.

11. The method of claim 9, wherein the physical surroundings include one or both of a make and/or a model of the second vehicle.

12. The method of claim 9, wherein the fleet of vehicles further includes a secondary vehicle, wherein the method further includes:
streaming information, by a first transceiver carried by the first vehicle, from the first vehicle to a remote computing server, wherein the streamed information includes a representation of the generated output signals;
receiving, by the remote computing server, the streamed information from the first vehicle; and
receiving a secondary stream of information from the secondary vehicle, wherein the secondary stream of information includes a representation of sensor signals generated by a secondary set of sensors carried by the secondary vehicle.

* * * * *